A. F. MASURY & A. G. HERRESHOFF.
BRAKE.
APPLICATION FILED MAY 14, 1917.
1,282,901.
Patented Oct. 29, 1918.
2 SHEETS—SHEET 2.
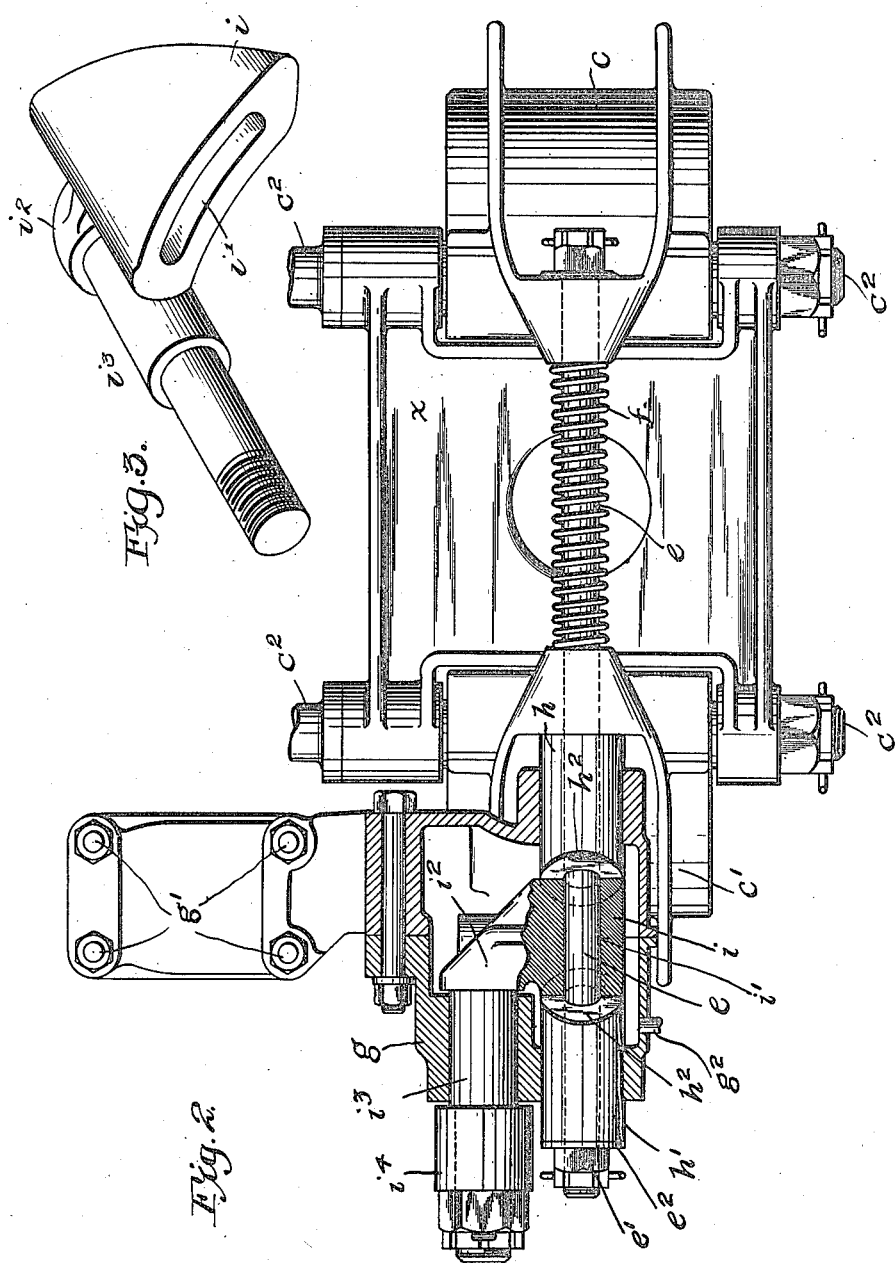
Inventors
Alfred F. Masury
Alexander Griswold Herreshoff
By
Attorney

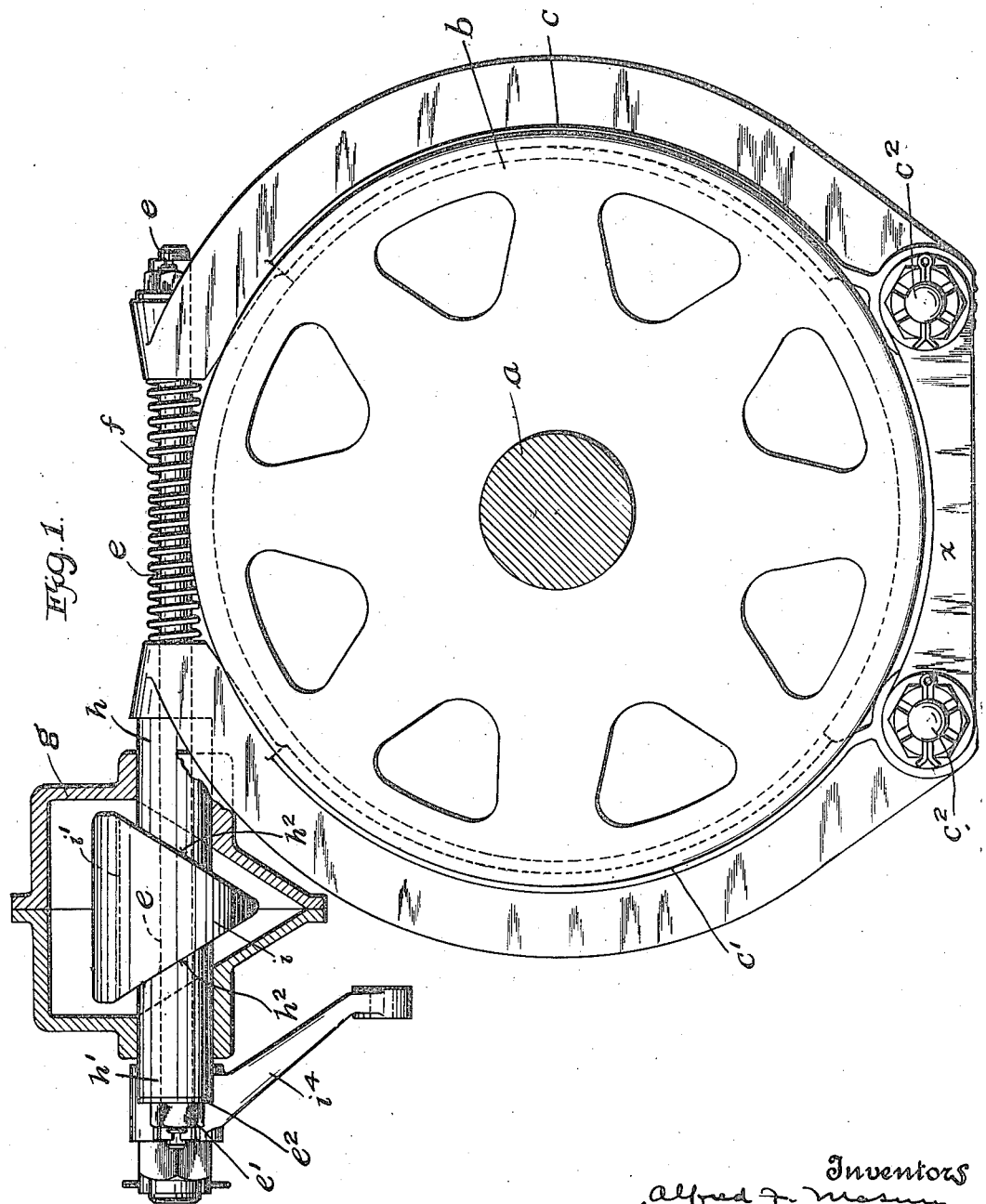

UNITED STATES PATENT OFFICE.

ALFRED F. MASURY AND ALEXANDER GRISWOLD HERRESHOFF, OF NEW YORK, N. Y., ASSIGNORS TO INTERNATIONAL MOTOR COMPANY, OF NEW YORK, N. Y., A CORPORATION OF DELAWARE.

BRAKE.

1,282,901.        Specification of Letters Patent.        Patented Oct. 29, 1918.

Application filed May 14, 1917. Serial No. 168,393.

*To all whom it may concern:*

Be it known that we, ALFRED F. MASURY and ALEXANDER GRISWOLD HERRESHOFF, citizens of the United States, and residents of the borough of Manhattan of the city of New York, in the State of New York, have invented certain new and useful Improvements in Brakes, of which the following is a specification, reference being had to the accompanying drawings, forming a part hereof.

This invention relates to brakes and is concerned particularly with external contacting brakes of that type adapted for use on automobiles. More particularly, the improved brake is designed with reference to its use on the propeller shaft of an automobile. The improved brake is composed generally of two segments which are intended to be drawn into snug engagement with the periphery of a brake drum which may, for example, be fixed on the propeller shaft of an automobile. The principal features of the brake are related to the brake actuating devices for said segments, the actuating devices being of such character and so applied to the segments as to insure a predetermined definite movement of the ends of the brake shoes, so that each shoe will be applied uniformly throughout its length to the drum and so the two shoes will be applied with substantially equal tension, thereby eliminating torsional strains. A further object of the invention is to construct the brake actuating devices in such manner that they will insure this desirable application of the shoes under equal tension at each actuation regardless of the relative clearance of the shoes from the drum upon release. A further feature of the invention has to do with the casing for the operating devices of the improved brake and, in the preferred embodiment, its relation to the transmission case. Reference is now to be had to the accompanying drawings for a detailed description of the illustrated embodiment of the invention, in which—

Figure 1 is a view, partly in end elevation and partly in section, of the improved brake showing its application to a drum on a propeller shaft of an automobile.

Fig. 2 is a view, partly in plan and partly in horizontal section, of the brake shown in Fig. 1.

Fig. 3 is a detail view in perspective of the operating wedge for the brake shoes.

As this description proceeds, it will appear that the invention is not to be limited in the application of the improved brake to a drum on the propeller shaft of an automobile, but that the adaptation of it to other conditions of use will be well within the skill of a mechanic. However, since the improved brake has been found especially advantageous in its application to a drum on the propeller shaft of an automobile and since it has been found further that the housing of the brake directly on the transmission case at the rear end thereof makes for a compact, strong and clean construction in automobile practice, this commercial embodiment has been illustrated herein. The propeller shaft $a$ shown in Fig. 1 may extend from the transmission case at the rear side thereof and may have affixed thereto a brake drum $b$ of suitable dimensions depending upon the load to be met with in the braking operations. The segmental brake shoes $c$, $c'$, which are disposed at opposite sides of the brake drum $b$ and coöperate with its periphery in the manner of external contacting shoes, are hinged at their lower ends on bolts $c^2$ which may extend rearwardly from the transmission case indicated by the reference character $d$. To stay these bolts $c^2$ and unite them firmly and hold them against torsional strains of all kinds, they preferably pass through a rigid metal plate $x$ which is of suitable form and character to serve its intended purpose. The upper ends of the brake shoes $c$, $c'$ are spaced from each other and are provided with channels to receive loosely an operating rod $e$, this rod serving incidentally to support a spiral spring $f$ which extends between the upper ends of the opposite shoes and normally tends to maintain them in released position out of engagement with the periphery of the drum. The casing $g$ for the operating devices for the brake shoes, hereinafter to be described, may also be secured to the transmission case $d$, as by means of bolts $g'$ and may, as usual, be made in sections adapted to permit the convenient assembling and disassembling of the case and its inclosed parts. The operating rod $e$, it will be noted, extends through the opposite side walls of the case $g$ and is received by sleeves $h$, $h'$, which are snugly but slidably supported in the opposite walls of the case. The operating rod $e$ passes through these sleeves slidably. One of the sleeves $h$, at its outer end, abuts against the upper end of one of the brake shoes $c'$.

Within the housing $g$ and disposed between the inner ends of the sleeves $h$, $h'$ is mounted a wedge-shaped operating member $i$, the inner ends $h^2$ of the sleeves $h$, $h'$ being tapered, as shown, to bear against the opposite tapered faces of the wedge $i$. This wedge member, shown most clearly in Fig. 4, is slotted, as at $i'$, to receive freely the operating rod $e$ which passes through the wedge. The slot $i'$ is of arcuate form for a purpose which will appear. The wedge $i$ is carried on an arm $i^2$ which is secured to a short rock shaft $i^3$ journaled in the case $g$ and connected at its outer end to an operating arm $i^4$ which may, in turn, be connected through suitable linkage with a brake pedal or other operating member.

In operation, when the rock shaft $i^3$ of the wedge $i$ is oscillated by the driver the wedge $i$ is thrown downwardly in the casing $g$, thereby moving the sleeves $h$, $h'$ axially in opposite directions. The tapered ends $h^2$ of these sleeves are, as explained, always in contact with the tapered faces of the wedge. The outer end of the actuating rod $e$ carries thereon a nut $e'$ and washer $e^2$ which bear against the outer end of one of the sliding sleeves $h'$, so that axial movement of such sleeve moves the actuating rod $e$ to a corresponding extent. In this way, it will be evident that as the wedge $i$ is thrown down, movement of the sleeve $h'$ will cause corresponding movement of the rod $e$ and thereby serve to draw the brake shoe $c$ toward the periphery of the brake drum. At the same time the other sleeve $h$ will be moved axially in the opposite direction and, by reason of its direct abutment against the end of the other brake shoe $c'$, will force that brake shoe into engagement with the periphery of the drum. This application of the brake shoes will take place against the action of the spring $f$. The swinging movement of the wedge $i$ along an arc will not be interfered with by the actuating rod $e$ which passes through the slot $i'$ in the block since this slot is of arcuate form corresponding to the arc along which the wedge $i$ is oscillated.

Since the wedge $i$ is of symmetrical taper on its opposite faces and since the sleeves $h$, $h'$ are of symmetrical form, the actuating movement of the wedge insures a definite predetermined and simultaneous movement of the upper ends of the brake shoes $c$, $c'$ into applied positions. The brake shoes are applied simultaneously and uniformly throughout their length and the applying force communicated to one is equal to that communicated to the other. A further feature has to do with the mounting of the rock shaft $i^3$ in the side wall of the casing $g$, the bearing portion of the rock shaft $i^3$ being of little greater effective length than the journal portion in the side wall, as appears clearly from Fig. 2. In this way a slight axial play of the rock shaft $i^3$ in the side wall is permitted. If it be assumed that the clearance of the two shoes $c$, $c'$ is not the same, it is desirable that upon application of the shoes this unequal clearance be compensated for automatically. This compensation is afforded by reason of the axial play of the rock shaft $i^3$ in the case. When the shoes are applied the upper ends thereof may move in one direction or the other with the actuating rod $e$ the wedge $i$ and the rock shaft $i^3$ into such position as will insure the equal distribution of the actuating force to the two brake shoes.

A further feature of the improved brake resides in the housing of the actuating devices proper in an oil-tight, dust-proof casing, such as $g$. This casing prevents dust from getting into the actuating parts and accordingly these parts are always well lubricated and most effective in their operation. The lubrication of the casing $g$ may be continuous since this casing may be connected by an oil duct $g^2$ with the transmission casing $d$, so that the supply of oil is constantly replenished from the transmission casing.

The compactness and strength of the improved brake in the particular application in an automobile shown have been mentioned hereinbefore. By mounting the brake directly at the rear end of the transmission case, a secure and convenient support is afforded therefor and the brake is well protected and yet accessible for repair. Again, the transmission case and the reinforcing plate $x$ through which the bolts $c^2$ pass insure a firm support for the brake, and torsional strains and the like which oftentimes accompany the application of brake shoes are adequately compensated for.

The scope of the invention will appear from the appended claims.

We claim as our invention:

1. Brake mechanism comprising opposed brake shoes, a slotted wedge, means to move the wedge, a rod extending from the free end of one of the shoes across the free end of the other shoe and through the slot in the wedge, a sleeve between the free end of the rod and one face of the wedge member, a second sleeve between the other face of the wedge member and the free end of the other shoe whereby movement of the wedge in one direction causes movement of the ends of the brake shoes.

2. In a brake mechanism, the combination with the brake drum, of a pair of brake shoes pivoted each at one end and partially encompassing said drum, a rod passing through the free ends of said shoes and having a head engaging the outer face of one of them, a sleeve slidably mounted on said rod and engaging the outer face of the other of said ends, said sleeve having an outer beveled end, a wedge movable on an axis eccentric to said rod engaging said beveled end, and a similarly beveled shoulder on the outer end of said rod engaging the other side of said wedge.

3. In a brake mechanism, the combination with the brake drum, of a pair of brake shoes each pivoted at one end and partially encompassing said drum, a rod passing through the free ends of said shoes and having a head engaging the outer face of one of them, a sleeve slidably mounted on said rod and engaging the outer face of the other of said ends, said sleeve having an outer beveled end, a casing in which said sleeve is slidably mounted, an abutment on the outer end of said rod and having its inner end beveled, a rockshaft journaled in said casing parallel to said rod, a wedge mounted on said rock-shaft and engaging said beveled ends, and means to actuate said rockshaft.

4. In a brake mechanism, the combination with the brake drum, of a pair of pivoted brake shoes to engage the same, a rod secured to the free end of one of said shoes and extending through the free end of the other, a spring on said rod between said ends, a sleeve slidably mounted on said rod and engaging the outer face of said last mentioned free end, the outer end of said sleeve being beveled, a casing in which said sleeve is slidably mounted, a rock-shaft rotatably and slidably mounted in said casing parallel to said rod, a curved wedge mounted on said rock-shaft and having an arcuate slot to receive said rod, and an abutment on the outer end of said rod and having its inner end beveled, said wedge coacting with said beveled ends to force said shoes against said drum.

5. In a brake mechanism, the combination with the drum, of a pair of independently pivoted brake shoes each partially encompassing the surface of said drum, a rod having a head engaging the outer face of the free end of one of said shoes and passing through the free end of the other shoe, a sleeve slidably mounted on said rod, one end of said sleeve engaging the outer face of said last mentioned free end and the other end being beveled off, a casing in one wall of which said sleeve is slidably mounted, a second sleeve on said rod, slidably mounted in the other wall of said casing and having its inner end beveled off, a rock-shaft journaled in said last mentioned wall and having a limited sliding movement therein, a wedge mounted on the inner end of said rock-shaft and having an arcuate slot through which said rod passes, the sides of said wedge engaging said beveled off ends, and an operating arm on the other end of said rock-shaft outside of said casing.

6. The combination with a transmission casing, a shaft projecting therefrom and a brake drum fast on said shaft, of a pair of bolts projecting from said casing parallel to said shaft, a brake shoe pivoted on each of said bolts and partially surrounding said drum, a rod passing through the free ends of said shoes and having a head engaging the outer side of one of said ends, a sleeve slidably mounted on said rod and having its inner end engaging the outer side of the other of said ends, a casing mounted on said transmission casing and in one wall of which said sleeve is slidably mounted, the outer end of said sleeve within said casing being beveled off, a second sleeve on said rod slidably mounted in the other wall of said casing and having its inner end beveled off, a rock-shaft journaled in the wall of said casing and capable of sliding therein, a curved wedge on the inner end of said rock-shaft and extending between said beveled off ends, said wedge having an arcuate slot through which said rod passes, and an operating arm on said rockshaft outside of said casing.

This specification signed this 10th day of May A. D. 1917.

ALFRED F. MASURY.
ALEXANDER GRISWOLD HERRESHOFF.